United States Patent [19]
Aigner

[11] Patent Number: 5,381,842
[45] Date of Patent: Jan. 17, 1995

[54] PROTECTIVE AND GUIDING DEVICE FOR WOOD SHAPING MACHINES

[76] Inventor: Georg Aigner, Thannenmais, D-8386 Reisbach, Germany

[21] Appl. No.: 64,110

[22] Filed: Jun. 16, 1993

[30] Foreign Application Priority Data

Sep. 25, 1991 [DE] Germany .............................. 4131943

[51] Int. Cl.6 ....................................... B27G 21/00
[52] U.S. Cl. .......................... 144/251 A; 144/252 R; 144/145 A; 409/134; 409/137; 409/226
[58] Field of Search ................... 83/100; 409/134, 137, 409/226, 228, 229; 144/251 R, 251 A, 252 R, 134 A, 145 A; 51/273; 15/301

[56] References Cited

U.S. PATENT DOCUMENTS

| | | | |
|---|---|---|---|
| 2,008,391 | 7/1935 | Hartzell et al. | 144/251 A |
| 3,786,846 | 1/1974 | Mehring | 144/251 A |
| 4,484,845 | 11/1984 | Pennella, Jr. et al. | 144/251 A |
| 4,821,365 | 4/1989 | Charters | 144/252 R |

Primary Examiner—W. Donald Bray
Attorney, Agent, or Firm—Cohen, Pontani, Lieberman, Pavane

[57] ABSTRACT

A protecting and guiding device for wood-shaping machines for shaping curved workpieces by means of a cutter (14) which is mounted on a spindle (12), projects vertically from a horizontal machine table (10), and is located underneath a covering hood (16) fastened to the machine table (10), a guide member (70) for the workpiece being held inside the covering hood (16). The covering hood has two side walls (18) connected with one another by a rear wall (20), a vertically adjustable front protective shield (28), and a top cover (22) provided with a connection piece (36) for a suction device. The two side walls (18) have smooth, plane inner surfaces (80) extending parallel to one another and are arranged so as to be horizontally displaceable independently from one another at the top cover (27) of the covering hood (16). A guide member (70) with two mutually parallel guide surfaces (78) can be supported at the mutually parallel inner surfaces (80) of the side walls (8) and guided at these inner surfaces (80) so as to be horizontally and vertically displaceable.

16 Claims, 7 Drawing Sheets

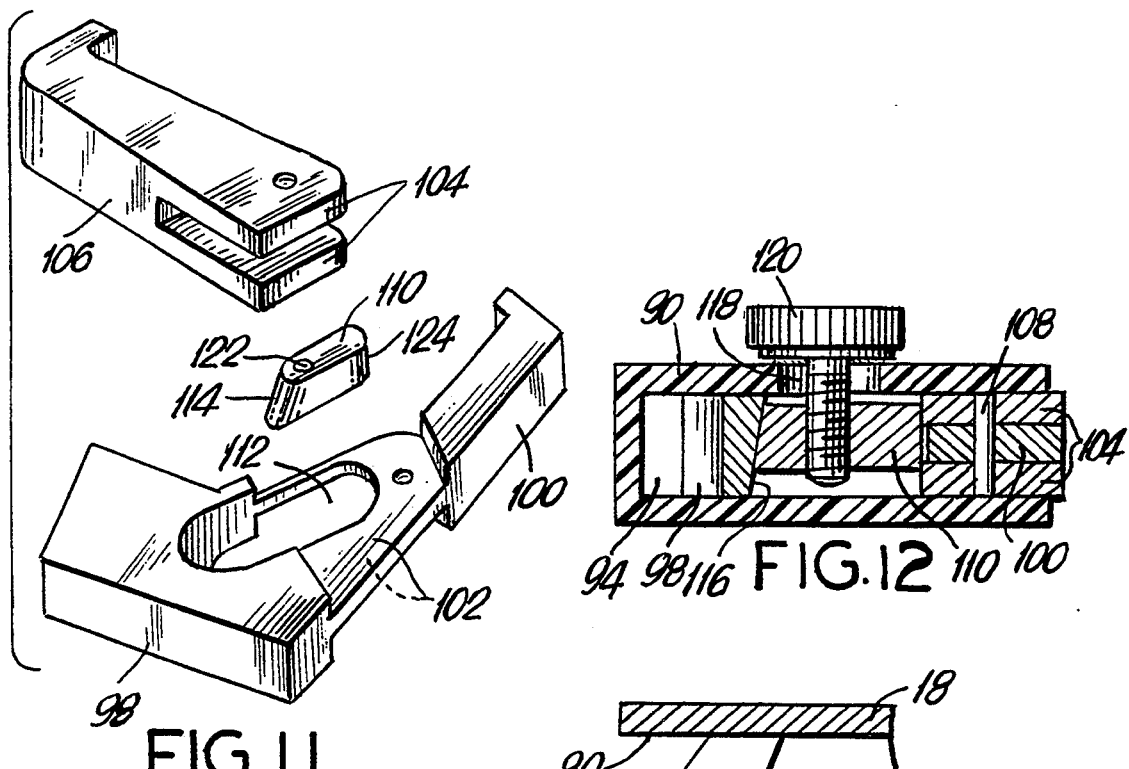
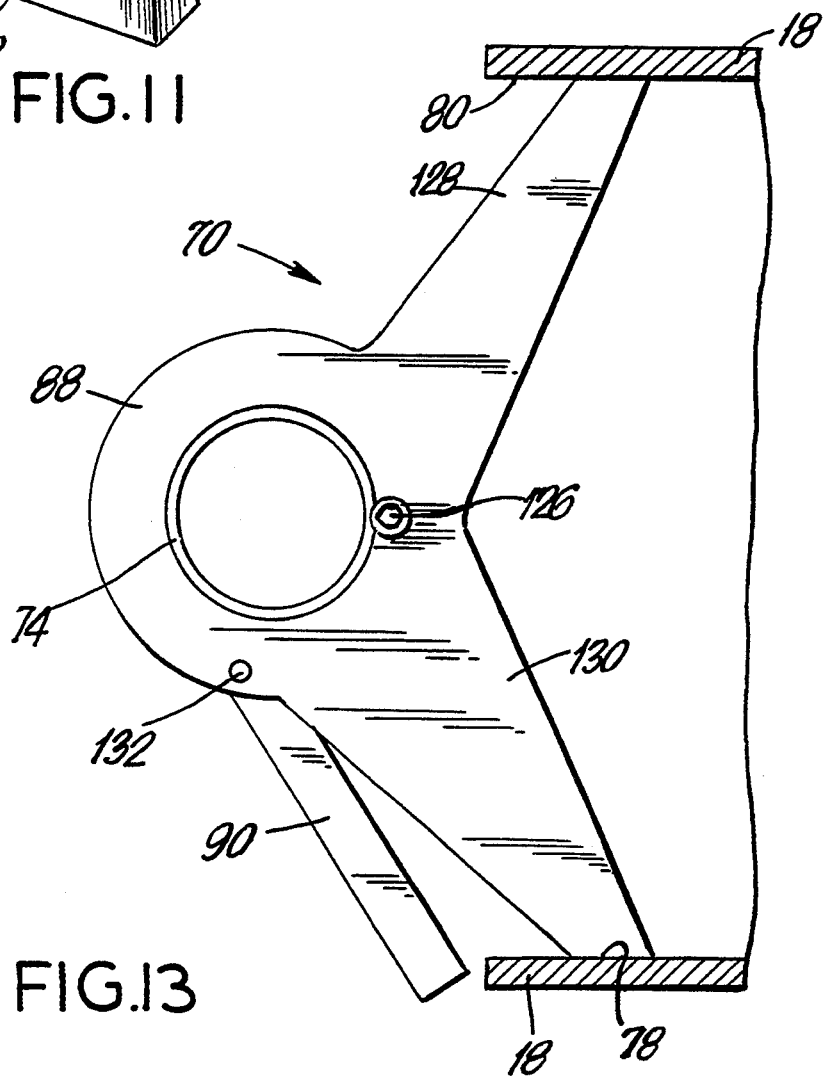

PROTECTIVE AND GUIDING DEVICE FOR WOOD SHAPING MACHINES

BACKGROUND OF THE INVENTION

The invention relates to a protecting and guiding device for wood-shaping machines for shaping curved workpieces by means of a shaping tool or cutter which is mounted on a spindle, projects vertically from a horizontal machine table, and is located underneath a covering hood fastened to the machine table, a guide member for the workpiece being held inside the covering hood. The covering hood has two side walls connected with one another by a rear wall, a vertically adjustable front protective shield, and a top cover provided with a connection opening for a suction device.

The subject matter of DE-OS 39 31 141 is a chip catching device for a table-type shaping machine for shaping curved workpieces of wood. Two mutually parallel, vertical clamping pieces with grooves for fastening a curved cutting stop or a stop ring are arranged in the area of the side of the covering hood which is open at the front. The disadvantage of the grooves consists in that they become soiled or gummed rapidly and must accordingly be cleaned frequently. The curved cutting stop can only be adjusted in the vertical direction at the covering hood and is fixed by means of hexagon socket screws which can only be accessed with relative difficulty within the covering hood by using a tool. The entire covering hood must be adjusted on the machine table in order to set the desired cutting depth. If greater changes in the cutting depth are required, another stop ring or curved cutting stop must be inserted, which is relatively complicated for the reasons stated above. The top cover of the covering hood is constructed in two parts, the rear part being fastened to the machine table, while the front part is arranged on the upper side of the rear part so as to be horizontally displaceable and carries a vertically adjustable protective shield. This construction inevitably results in work positions in which the front part of the top cover is entirely pulled out so that an opening is formed in the central region above the spindle through which the chips escape before they can be collected by the suction device. A further disadvantage consists in that the covering hood must be centered by means of an adjusting plate before work begins for the stop ring which is to be installed subsequently. As a result of the indicated construction, a relatively large amount of space is required within the covering hood for fastening the aforementioned guide members so that limits are imposed on the use of larger cutters. In addition, projecting screws inside the covering hood pose a great risk for the rotating cutter.

SUMMARY OF THE INVENTION

The present invention has the object of providing a protecting and guiding device of the constructional type outlined above, whose position can be adapted simply and quickly to the respective shaping process and enables a reliable centering of the guide member without bulky fastening members or tools.

This object is met, according to the invention, in the device of the generic type indicated above in that the two side walls have smooth, plane inner surfaces extending parallel to one another and are arranged so as to be horizontally displaceable independently from one another at a rim projecting downward from the top cover.

In this solution, the two side walls can be displaced and fixed independently from one another so as to adapt to the respective cutting depth and tool diameter and so as to make optimal use of the space covered by the hood. In general, for this purpose the side wall located on the feed side is drawn back further so as to cover the cutting area as extensively as possible.

In a further development of the invention, vertical elongated slots are provided in the lower region of the side walls for inserting screws for fastening the covering hood to the machine table. The head of the screws is advantageously constructed as a clamping lever so that they can be tightened or loosened manually without tools.

According to another feature of the invention, vertical holding bore holes are formed in the side walls for receiving supporting means for pressing members or guiding members. Such auxiliary devices can accordingly be fastened directly to the covering hood.

In a particularly advantageous manner, the front edges of the side walls have vertical grooves for receiving an auxiliary tool, e.g. a stop shoulder or cutting block, in such a way that the latter can be adjusted in height.

In so doing, an angle bracket or fastening angle with two L-shaped legs for engaging in the elongated slots can be arranged at the stop shoulder, one leg being swivelably supported. A wedge which is movable vertically by a fixing screw is provided in a cut out portion of the fastening angle to allow the movable leg to swivel.

To adjust the effective length of the stop shoulder, the fastening angle is fastened at the stop shoulder so as to be adjustable in the longitudinal direction of the latter. This is effected most simply by means of the fixing screw.

According to a particularly advantageous feature of the invention, a guide member with two mutually parallel guide edges is supported at the mutually parallel inner surfaces of the side walls and is guided at these inner surfaces so as to be horizontally and vertically displaceable.

In such a solution, the clamping strips of known construction arranged at the covering hood and adjusting members can be dispensed with, since the guide member is fastened in a precise manner and so as to be fixed with respect to relative rotation within the covering hood by its guide edges alone and is always automatically held in a centered position. Clamping screws or the like which are hard to access within the covering hood can likewise be dispensed with so that it is possible to adjust the guide member quickly for adapting to different cutting depths without having to change the position of the covering hood over the tool spindle for this purpose.

Fastening the guide member on the spindle via a radial bearing allows it to be exchanged quickly when necessary. Thus, when the height of the spindle and cutter is adjusted, the guide member is also automatically adjusted correctly without having to be loosened and then fixed again with the aid of a tool.

The guide member can be constructed so as to have a base plate which is supported at the spindle and at the inner surfaces of the side walls and which carries a curved cutting stop which is supported on the base plate so as to be horizontally adjustable for setting the cutting depth.

In this solution, the curved cutting stop can be simply and quickly fixed on the base plate for changing the cutting depth by simple manual adjustments so that a curved workpiece can then be cut by means of spot cutting.

The selected position of the curved cutting stop on the base plate can be fixed by means of clamping screws which engage through longitudinal grooves which are formed in the curved cutting stop parallel to the guide edges. The clamping screws are easily accessible and can be quickly loosened and tightened again with a tool.

Another possibility consists in constructing a part of the guide member as a stop ring from which a stop shoulder projects in a swivelable manner. Thus, a unit is provided in which the stop shoulder is integrated in the stop ring so that no additional fastening is required. The length of the stop shoulder is adjustable telescopically.

The invention is described in the following with reference to embodiment examples which are shown in the drawing.

BRIEF DESCRIPTION OF THE DRAWINGS

FIG. 11 shows an exploded view of the fastening angle;

FIG. 12 shows a sectional view of the fastening angle installed in the stop shoulder in the plane XXII—XXII of FIG. 9;

FIG. 13 shows a top view of a variant of the guide member with integrated stop shoulder.

DETAILED DESCRIPTION OF THE INVENTION

Figure 7:
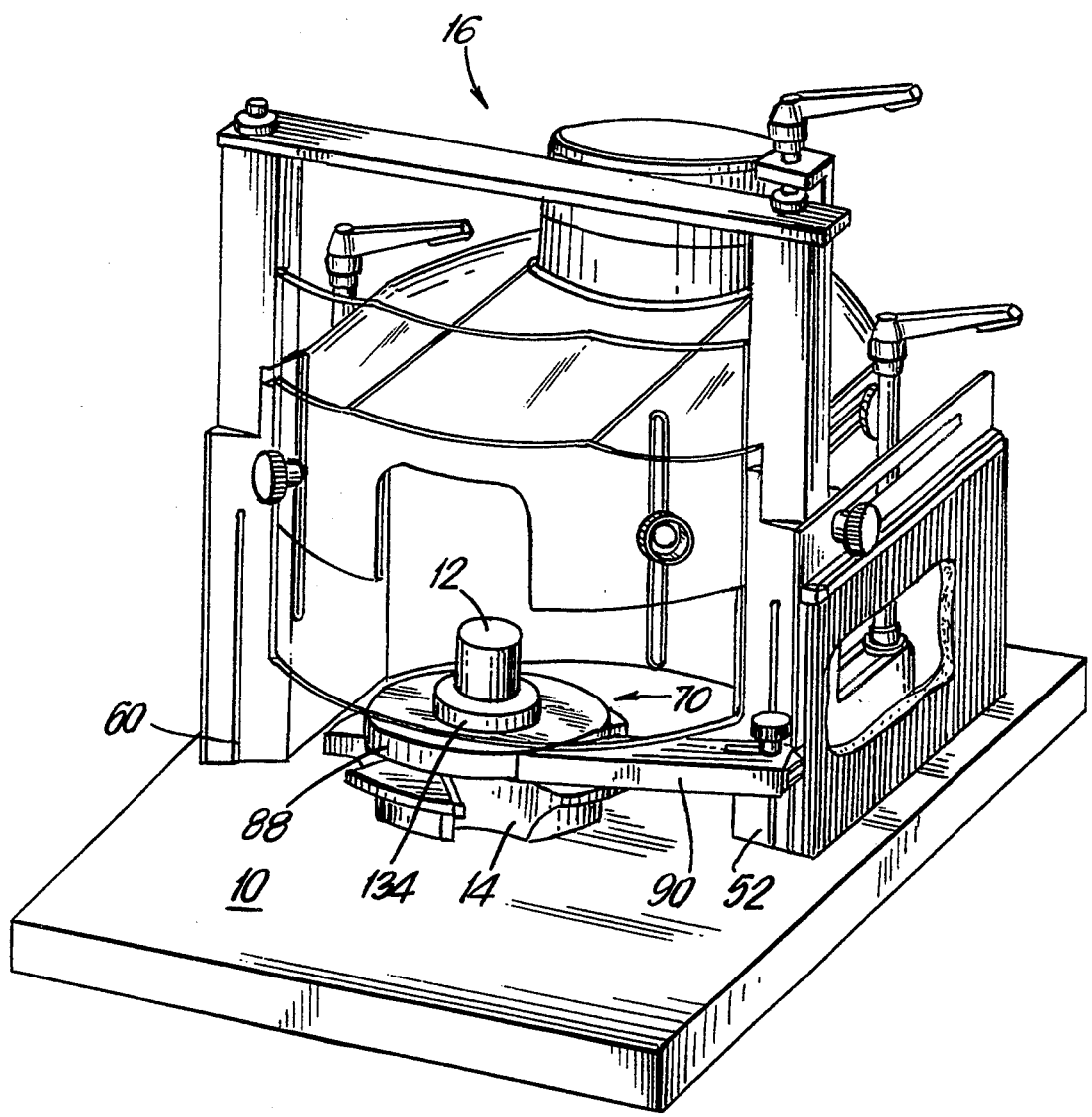
FIG. 7 shows the protecting and guiding device in connection with a stop ring and a stop shoulder.

FIG. 7 shows a horizontal machine table 10 of a wood-shaping machine through which a vertical spindle 12 projects. The rotating drive of the latter is not shown. A cutter 14 which can be used for shaping curved workpieces is fastened on the spindle 12.

Figure 1:
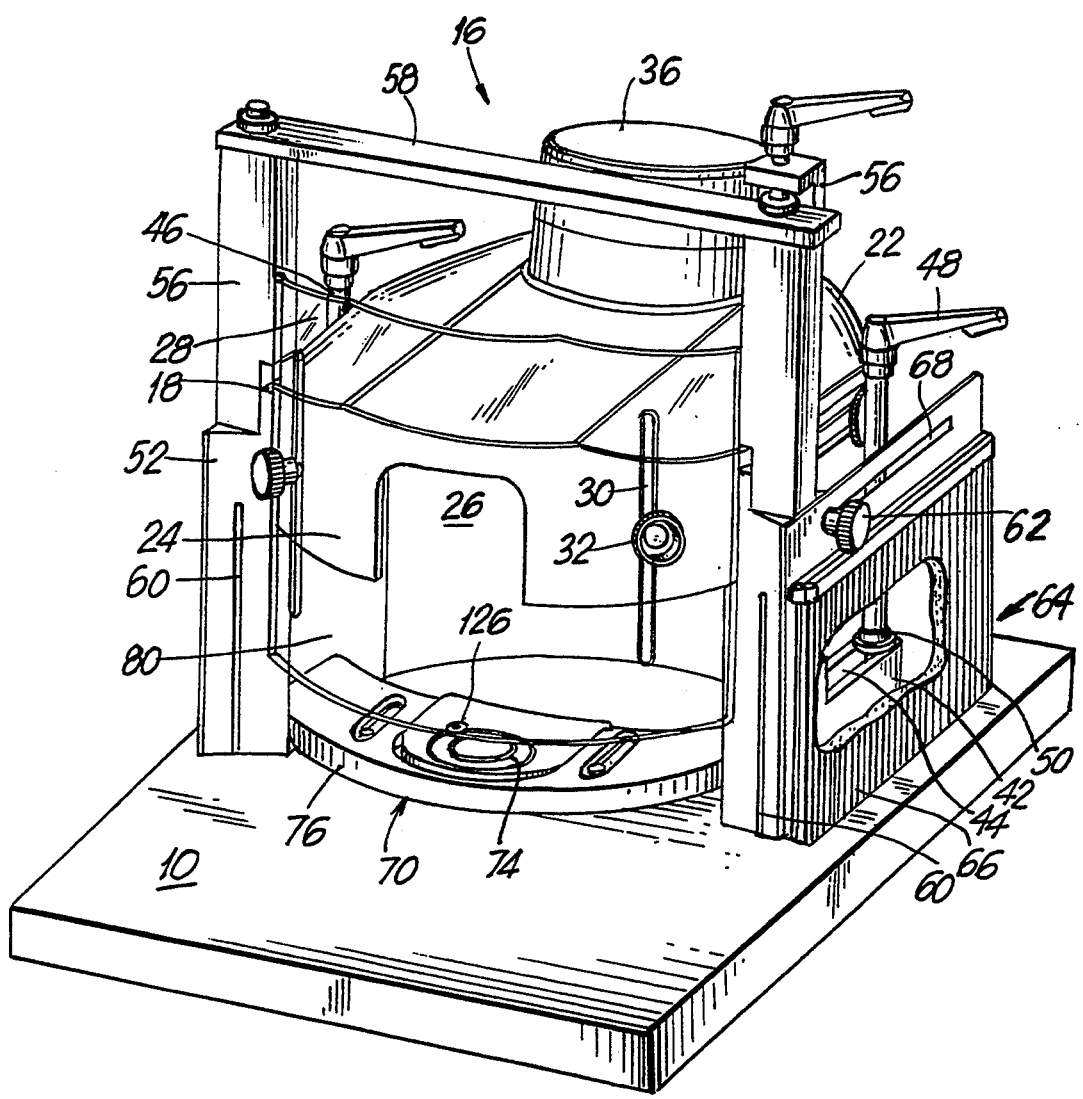
FIG. 1 shows an oblique view from the front of a protecting and guiding device in which a curved cutting stop serves as guide member.
Figure 2:
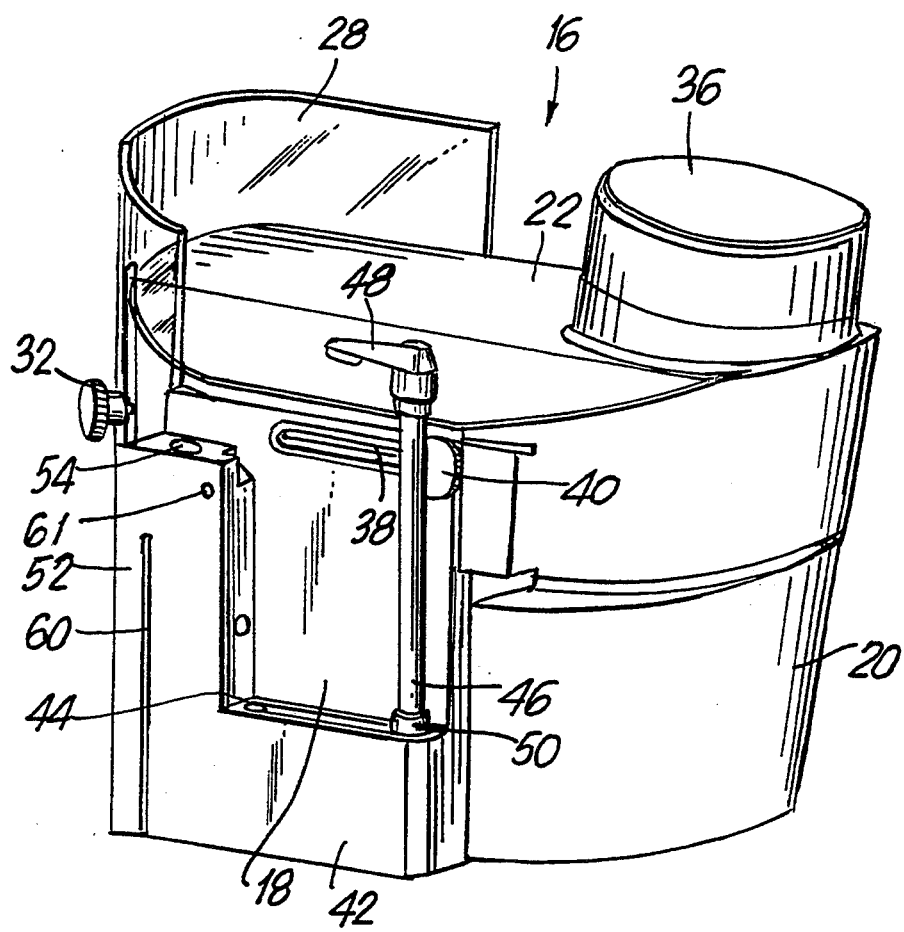
FIG. 2 shows a perspective rear view of the protecting and guiding device according to FIG. 1 without supporting member.

With reference now to FIGS. 1 and 2, the spindle 12 and workpiece are omitted so as not to obscure the individual parts. A covering hood 16 which covers the work area above the spindle, also omitted for clarity, is fixed on the machine table 10. The covering hood 16 includes two side walls 18, a rear wall 20 (FIG. 2) which connects the side walls 18 and is inclined in the manner of a hopper, and a top cover 22 which is securely connected with the rear wall 20. A rim 24 projects down from the top cover 22 to the front and sides and has a cut out portion 26 which opens downward in the front area so as to allow a better view into the interior of the covering hood 16. The front opening of the covering hood 16 can be covered by means of a vertically movable, transparent protective shield 28. The curved protective shield 28, in which two mutually parallel elongated holes 30 are formed, can be fixed at the desired height at the downwardly projecting front rim 24 of the top cover 22 by clamping screws 32.

Figure 3:
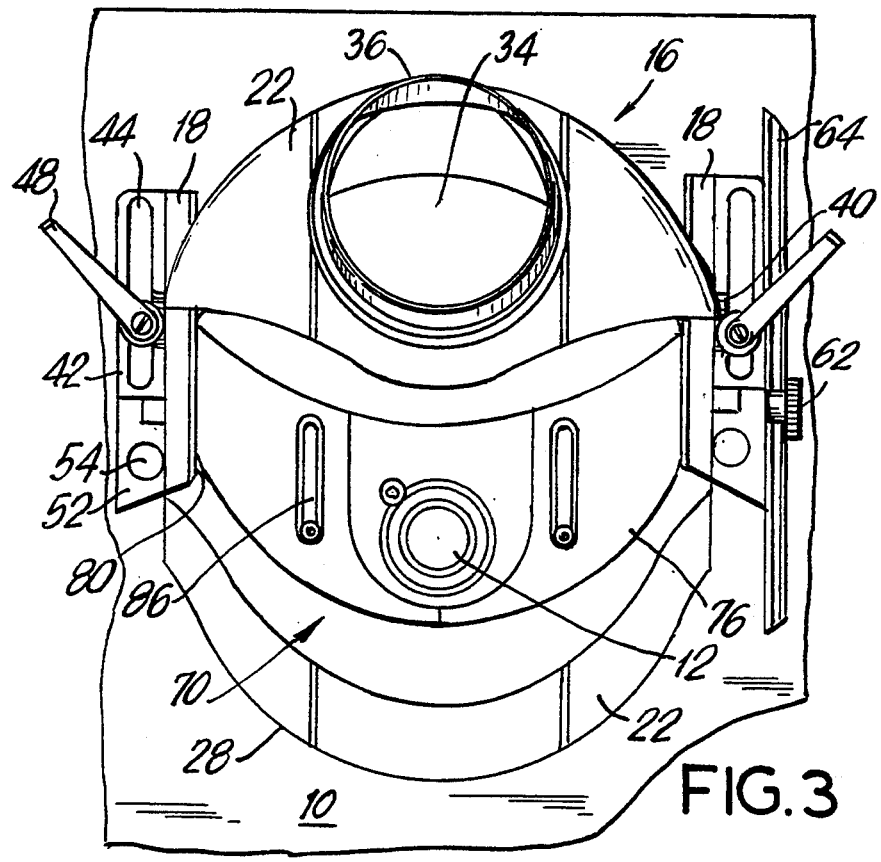
FIG. 3 shows a top view of the protecting and guiding device in a first work position.

As shown in FIG. 3, a connection opening 34, to which is connected a cylindrical connection piece 36 for connecting a suction device, is formed in the rear of the top cover 22. The connection piece 36 merges smoothly into the rear wall 20, which is inclined as shown in FIG. 2, in the rear area so as to ensure a trouble-free suction of chips and dust.

According to the invention, the two side walls 18 are displaceable in the horizontal direction independently from one another. For this purpose, each side wall 18 has an upper, horizontally extending elongated slot 38 penetrated by a knurled screw 40 which is screwed into a threaded bore hole, not shown, at the downwardly projecting rim 24 of the top cover 22. After loosening the knurled screw 40, the corresponding side wall 18 at the covering hood 16 can be adjusted toward the front or back, which will be discussed at greater length in the following. A step 42 in which a vertical elongated slot 44 is formed projects out from each side wall 18 in the lower area. The threaded end of a screw 46 is inserted through this elongated slot 44 and carries, at its upper end, a clamping lever 48 which is situated above the top cover 22. In its central region, the screw 46 has a collar 50 which is supported on the upper side of the step 42. The threaded end of the screw 46 is screwed into a threaded bore hole of the machine table 10 so that the covering hood 16 can be fastened via the screws 46.

As can be seen particularly from FIG. 2, each side wall 18 has a front, thickened area 52 in which a vertical holding bore hole 54 is formed. Each of the two holding bore holes 54 of the side walls 18 serves to receive a supporting column 56 (FIG. 1), the supporting columns 56 being connected with one another via a crosspiece 58. The crosspiece serves to fasten pressing members or guide members which are not shown in more detail, e.g. pressure rolls or other elements for pressing against the workpiece so as to hold and guide it.

According to the invention, it is further suggested that vertical grooves 60 be incorporated in the front edges of the thickened areas 52 of each side wall 18. These vertical grooves 60 serve to receive an auxiliary tool in such a way that it can be adjusted in height. This will be discussed at greater length in the following description.

Each side wall 18 has a threaded bore hole 61 (compare FIG. 2) in the thickened area 52 for receiving a clamping screw 62. A dust screen 64 with downward facing bristles 66 is fastened at the side wall 18 by means of the clamping screw 62. Since the clamping screw 62 engages through a horizontal elongated slot 68 of the dust screen 64, the latter can be adjusted horizontally.

Figure 4:
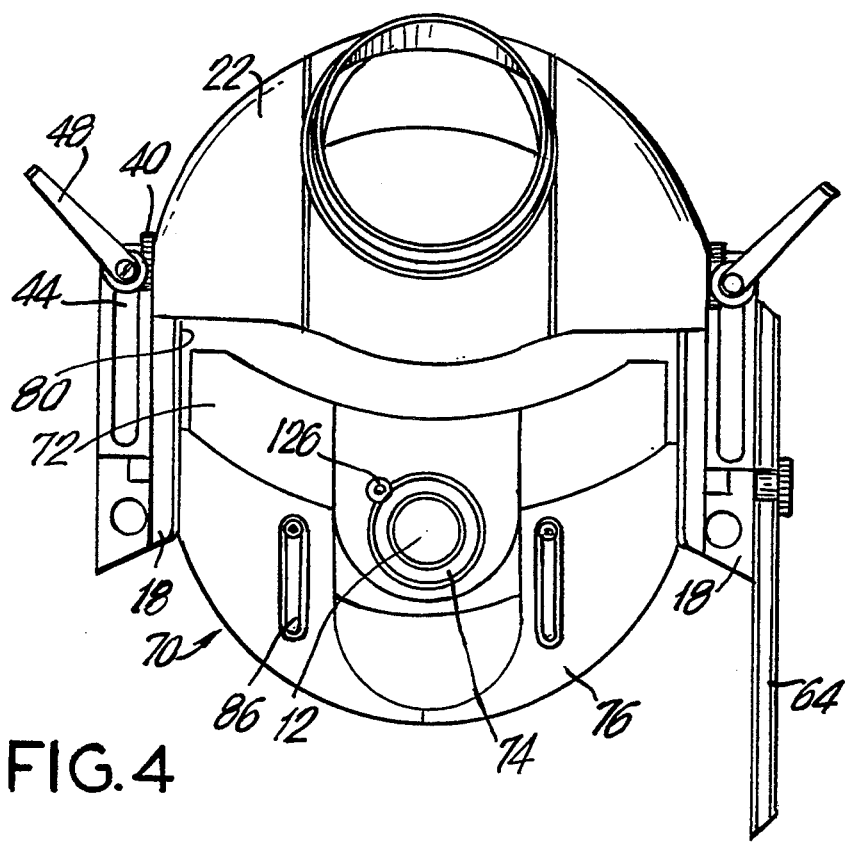
FIG. 4 shows a top view in a second work position.
Figure 5:
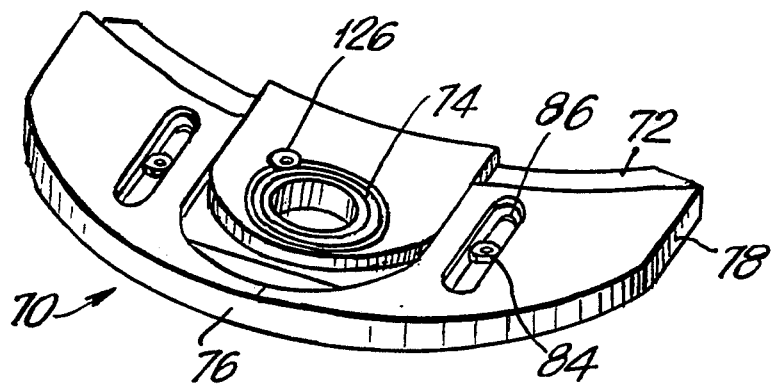
FIG. 5 shows a view of the curved cutting stop used in FIG. 1.
Figure 6:
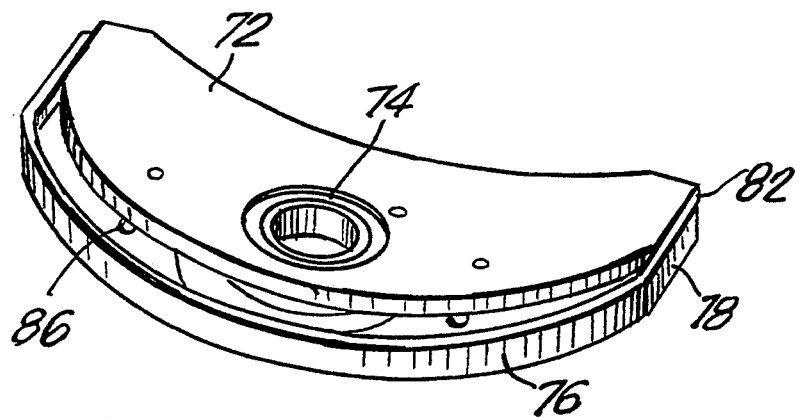
FIG. 6 shows a view from below of the curved cutting stop of FIG. 5.

In the application of the covering hood 16 shown in FIGS. 1 to 4, a guide member 70 is used for the workpiece to be shaped, the latter being shown in more detail in FIGS. 5 and 6. The guide member 70 has an approximately bow-shaped, planar base plate 72 which can be fastened on the spindle 12 by means of a radial ball bearing 74. The ball bearing 74 is fixed by means of a countersunk screw 126 and can be removed easily for inserting a spindle of a different diameter. The base plate 72 carries a curved cutting stop 76 which has two mutually parallel guide edges 78. As is shown in FIGS. 1, 3 and 4, the guide edges 78 are supported at the mutually parallel, smooth and plane inner surfaces 80 of the two side walls 18. The two mutually parallel guide edges 78 of the curved cutting stop 76 overlap the side edges 82 of the base plate 72 so as to ensure parallel guidance when moving the curved cutting stop 76. The curved cutting stop 76 can be fixed in the desired position by two hexagon socket screws 84 which project through longitudinal grooves 86 incorporated in the curved cutting stop 76 so as to be parallel to the guide edges. The hexagon socket screws 84 are screwed into threaded bore holes of the base plate 72.

Since the guide member 70 with the curved cutting stop 76 is supported, via the radial bearing 74, on the spindle 12 for the cutter 14, it follows every vertical adjustment of the cutter 14 so that it need not be adjusted individually. Fastening at the side walls 18 by means of screws and tools can be dispensed with, since the guide edges 78 are guided at the parallel, plane inner surfaces 80 of the side walls 18 so as to be fixed with respect to relative rotation, but so as to be vertically and horizontally displaceable.

FIG. 3 shows the above-mentioned protecting and guiding device in a position in which the two side walls 18 are fastened in a rear position at the covering hood 16, the side wall 18 on the right in FIG. 3 being displaced somewhat further to the rear than the side wall 18 on the left. This divergent position of the two side walls 18 independent from the position of the protective shield 28 produces an optimal operating position of the entire protecting and guiding device. The curved cutting stop 76 of the guiding member 70 is situated in its completely pushed in position. The front rim of the covering hood 16 which is covered by the protective shield 28 is located very far in front of the spindle 12 of the cutter in this position. In this position, cutters with large diameters can be used and a very large cutting depth can be achieved.

FIG. 4 shows another extreme position of the protecting and guiding device in which the two side walls 18 are fixed in their foremost position at the covering hood 16. Further, the curved cutting stop 76 of the guide member 70 is completely drawn out. The front rim of the covering hood 16, not shown here, is situated close in front of the front rim of the curved cutting stop 76. In such a position, very small cutting depths can be produced with relatively small cutters.

Figure 9:
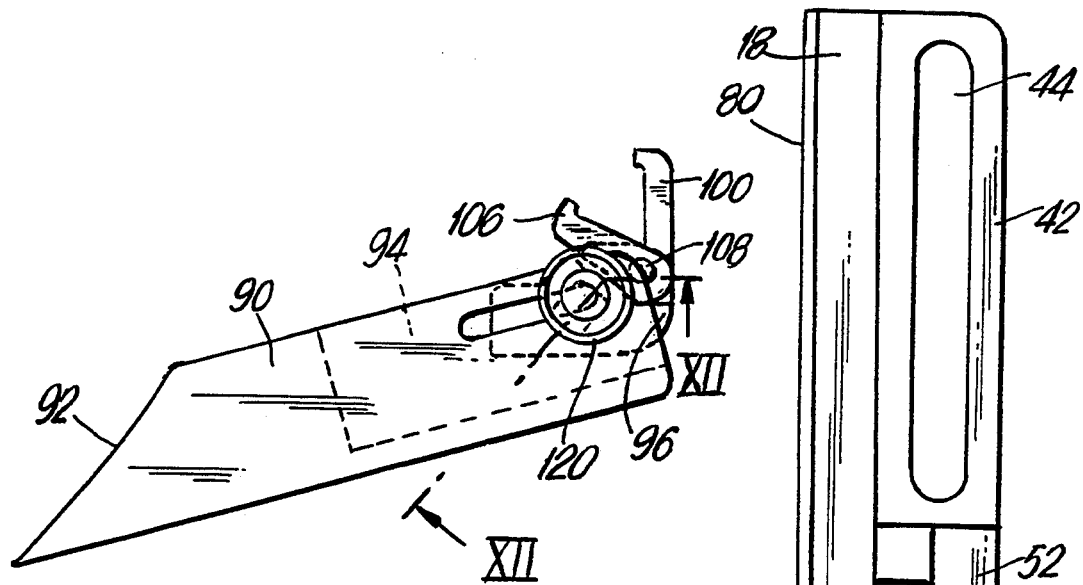
FIG. 9 shows a top view of the stop shoulder according to FIG. 8.
Figure 8:
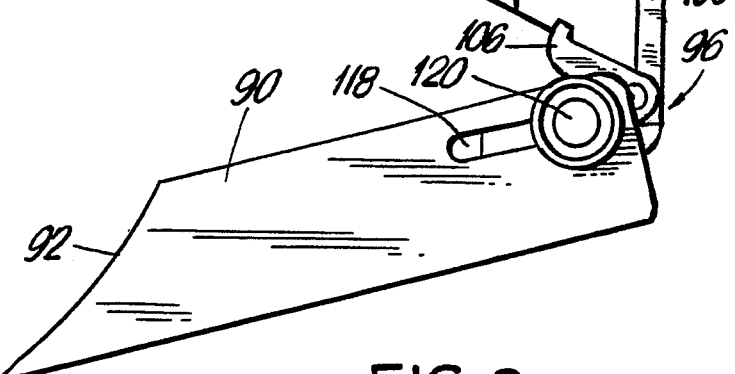
FIG. 8 shows a top view of the stop shoulder, according to FIG. 7, mounted at a side wall.
Figure 10:
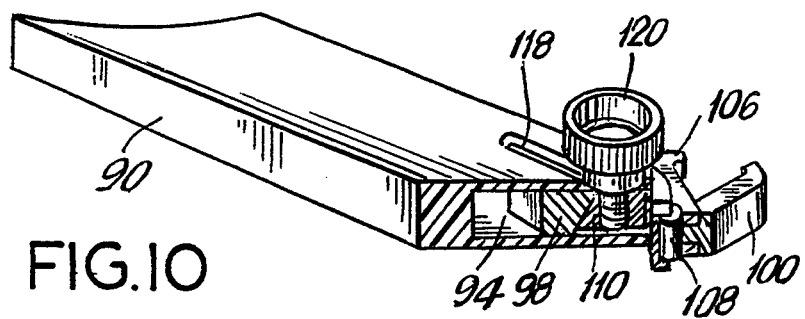
FIG. 10 is a sectional oblique view of the stop shoulder from the front, showing the fastening angle.

FIG. 7 shows the use of a guide member 70 in the form of a stop ring 88. This stop ring 88 is likewise supported on the spindle 12 of the cutter 14 via a radial bearing and rotates along with the spindle 12. The radial bearing is not visible in this figure, since it is situated below an intermediate ring 134. A stop shoulder 90, shown in FIGS. 8 to 10, is provided so as to ensure a reliable feed of the workpiece to be shaped by the cutter 14, its free, bow-shaped end 92 contacting the outer circumference of the stop ring 88. The stop shoulder 90 which is made from plastic and has a slot-like recess 94 at its end lying opposite the free end 92 is fixed at the front edge of the side wall 18 at right in FIG. 7 by means of a fastening angle 96. As is shown particularly in FIG. 11, the fastening angle 96 has a square base body 98 from which an L-shaped leg 100 projects. The leg 100 has a stepped flattened portion 102 on both sides in the area where it joins the base body 98. The flattened portion 102 engages between two mutually parallel prongs 104 of a movable L-leg 106 which is swivelable relative to a stationary leg 100 via a pin 108. The two free ends of the L-shaped legs 100 and 106 engage in the two vertical grooves 60 which are constructed at the thickened region 52 of the respective side wall 18.

A wedge 110 which is inserted in an oval cut out portion 112 of the base body 98 and is supported with its wedge surface 114 at a corresponding slanting surface 116 of the oval cut out portion 112 serves to fix the stop shoulder 90 at the desired height. The fastening angle 96 constructed in the above-described manner is inserted into the recess 94 of the stop shoulder 90 which has in this region an elongated hole 118 extending in its longitudinal direction. The shank of a fixing screw 120 which is screwed into a threaded bore hole 122 of the wedge 110 projects through this elongated hole 118. When the fixing screw 120 is tightened, its threaded shank draws the wedge 110 upward so that its wedge surface 114 slides at the inclined surface 116 and, in doing so, presses with its opposite, vertical surface 124 against the opposite side of the movable leg 106 so that the latter is turned in the direction of the stationary leg 100. In this way, the fastening angle 96 is fixed in the two vertical grooves 60 and the stop shoulder 90 is simultaneously clamped in the desired position on the fastening angle 96.

FIG. 13 shows another variant of the guide member 70 which is here also constructed as a stop ring 88 which is supported on the spindle 12 by means of the radial bearing 74. The radial bearing 74 is fastened in the stop ring 88 by the countersunk screw 126 so as to be exchangeable. Two asymmetrically shaped arms 128 and 130 forming a V project from the stop ring 88, their free ends being constructed as two mutually parallel guide edges 78. These guide edges 78 are supported at the opposite, mutually parallel inner surfaces 80 of the side walls 18 so that the guide member 70 is held within the covering hood 16 so as to be fixed with respect to relative rotation when the spindle rotates. Since no fastening elements are provided between the covering hood 16 and the guide member 70, the guide member 70 can be adjusted relative to the side walls 18 of the covering hood 16 at any time as required in both the horizontal and vertical directions.

Finally, FIG. 13 shows that a stop shoulder 90 projects from the guide member 70 and is swivelably supported at the guide member 88 by means of a pin 132. The stop shoulder 90 is articulated in the area in which it merges virtually tangentially into the stop ring 88, whose rounded portion at the other end continues as far as possible toward the narrower arm 128. In this way, curved workpieces can be guided on a large circumferential area of the stop ring 88. The length of the stop shoulder 90 can be adjusted telescopically, which is not shown in more detail.

I claim:

1. A protective device for use in a wood-shaping machine having a machine table defining a planar support surface and having a wood-shaping tool disposed on a rotatable spindle, said device comprising;
   a hood securable to the machine table for covering said wood-shaping tool, said hood including a top cover portion defining an opening for receiving a suction device and having a downwardly depending rim,
   a front shield vertically adjustable relative to said rim, first and second parallel side walls, each of said side walls having a planar, inwardly facing surface, and a rear wall interconnecting said side walls; and a work piece guide member disposed between said side walls.

2. The protective device according to claim 1, wherein each of said side walls defines a vertical elongated slot dimensioned and arranged to receive means for fastening said hood to the machine table.

3. The protective device according to claim 1, wherein each of said side walls defines a vertical bore dimensioned and arranged to receive means for supporting a work piece pressing member.

4. The protective device according to claim 1, wherein each side wall includes a front edge defining a vertical groove dimensioned and arranged to receive a height adjustable tool.

5. The protective device according to claim 4, wherein said height adjustable tool is a stop member, said device further including a fastening angle member having two L-shaped legs and being positionable proximate said stop shoulder, one leg of each member being swivelably supported.

6. The protective device according to claim 5, wherein said fastening angle further includes a wedge member for swiveling adjustment of said one leg, said fastening angle member defining a cut-out portion for receiving said wedge member and including means for retaining the wedge in a selected vertical position.

7. The protective device according to claim 5, wherein said fastening angle member is secured to the stop shoulder to permit adjusting movement in a longitudinal direction.

8. The protective device according to claim 1, wherein said rim defines a downwardly extending cut out portion in a central region thereof.

9. The protective device according to claim 1, further including at least one dust screen having downwardly facing bristles adjustably fastened to at least one side wall.

10. The protective device according to claim 1, wherein said guide member has two parallel guide edges respectively supported at a corresponding one of said inwardly facing sidewall surfaces, said guide member being horizontally and vertically displaceable relative to said sidewall surfaces.

11. The protective device according to claim 10, further including a radial bearing for coupling said guide member to the spindle.

12. The protective device according to claim 10, wherein said guide member includes a base plate supportable by the spindle and the inwardly facing surfaces of said sidewalls and a curved cutting stop supported by said base plate and horizontally positionable relative thereto for selecting a cutting depth.

13. The protective device according to claim 12, further including means for selectively retaining the cutting stop at a desired position relative to the base plate, said retaining means including at least one clamping screw insertable into a respective groove defined in said cutting stop.

14. The protective device according to claim 11, means for exchangeably fastening said radial bearing to said guide member.

15. The protective device according to claim 10, wherein said guide member includes a stop ring having first and second projecting arms which define said parallel guide edges.

16. The protective device according to claim 15, further including a stop shoulder having a telescopically adjustable length, said stop shoulder being swivelably connected to said guide member so as to project therefrom.

* * * * *